F. ADEE & J. FOLEY.
PLUMBERS' TRAPS.

No. 178,577. Patented June 13, 1876.

Witnesses
Chas H. Smith
Harold Serrell

Inventors
Frederick Adee.
James Foley.
per Lemuel W. Serrell
Atty

UNITED STATES PATENT OFFICE.

FREDERICK ADEE AND JAMES FOLEY, OF BROOKLYN, NEW YORK.

IMPROVEMENT IN PLUMBERS' TRAPS.

Specification forming part of Letters Patent No. 178,577, dated June 13, 1876; application filed April 28, 1876.

*To all whom it may concern:*

Be it known that we, FREDERICK ADEE and JAMES FOLEY, of Brooklyn, in the county of Kings and State of New York, have invented an Improvement in Plumbers' Traps, of which the following is a specification:

In Letters Patent heretofore allowed to us a plumber's trap is shown in two parts, with a wall or partition cast in one of the halves of the trap. Our present invention is made for bringing the joint between the two parts of the trap in the upper part thereof, above the water-line, so as to lessen the risk of any leakage in cases where the trap may become misplaced and injured by the settling of the building in which such trap may be placed, or otherwise.

We make the said trap of two parts. The bottom part is cup-shaped and elliptical, with a dam cast therein, and to this the escape-pipe is connected, either at the bottom or passing off at an inclination. The other part is the top, and to this the inlet-pipe is attached, and passes down into the cup-shaped lower part below the water-line, and the two parts are connected by a joint that is horizontal or nearly so, said joint being made by either solder or by melting the edges of the lead.

Figure 1:
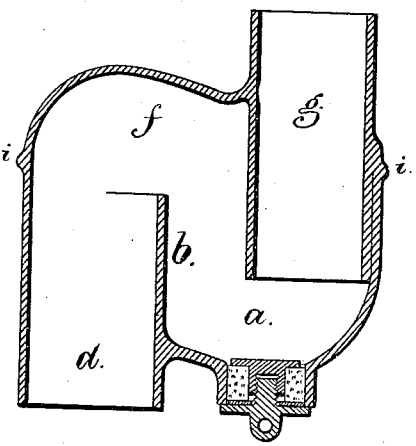
Figure 4:
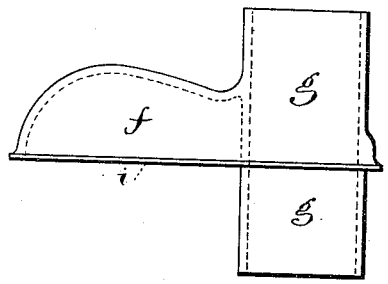
Figure 2:
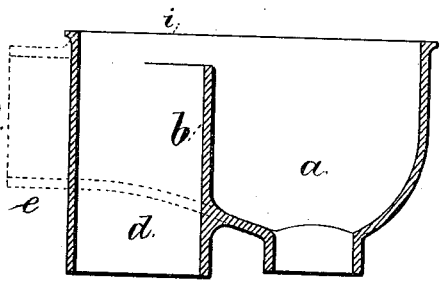
Figure 3:
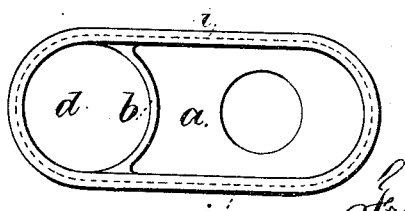

In the drawing, Figure 1 is a section of the trap complete. Fig. 2 is a section of the bottom part, separately. Fig. 3 is a plan of the same, and Fig. 4 is an elevation of the upper part of the trap.

The lower part of the trap is made as an elliptical cup, $a$, of suitable depth, the walls thereof being nearly vertical, and the bottom rounding. There is a dam, $b$, in the cup $a$, and the walls and dam are preferably made slightly thinner at top than at bottom, so that the mold in which the trap is cast may be composed of two pieces, thereby lessening the expense of the molds and increasing the rapidity with which the castings can be made. The delivery-pipe is shown as passing away from the bottom, as at $d$. If this improvement is applied to a P-trap the collar for the horizontal pipe will be cast at one side, as shown by dotted lines at $l$, the mold being so made as to form such collar. The top part $f$ of the trap is made preferably more or less hollow, but it might be nearly flat, and to this the inlet-pipe $g$ is either attached or cast in one piece, such pipe being a tubular downward extension of a length to reach the required distance below the water-line of the trap, so that when the parts of the trap are placed together the joint that is made by solder or melting the lead at the line $i\ i$ will preferably be above the water, and the trap will be reliable under all circumstances of use.

The trap made as aforesaid can be cast in lead with very simple molds, and, when complete, there will be no risk of the water being drawn or siphoned out.

We claim as our invention—

The plumber's trap made of two parts, one of which is cup-shaped and cast with a dam in it, and the other is cast with a tubular extension, and the two parts are united by a horizontal or nearly horizontal joint, substantially as set forth.

Signed by us this 26th day of April, 1876.

FREDERICK ADEE.
      JAMES FOLEY.

Witnesses:
 GEO. D. WALKER,
 CHAS. H. SMITH.